(12) United States Patent
Sakurai et al.

(10) Patent No.: US 7,313,643 B2
(45) Date of Patent: Dec. 25, 2007

(54) PCI-EXPRESS TO PCI/PCI X TRANSLATOR

(75) Inventors: Toshimi Sakurai, Shizuoka (JP);
Jinhun Shou, Santa Clara, CA (US);
Peter Chu Tin Teng, Fremont, CA (US)

(73) Assignee: NEC Electronics America, Inc., Santa Clara, CA (US)

( * ) Notice: Subject to any disclaimer, the term of this patent is extended or adjusted under 35 U.S.C. 154(b) by 194 days.

(21) Appl. No.: 10/780,023

(22) Filed: Feb. 17, 2004

(65) Prior Publication Data

US 2005/0182887 A1    Aug. 18, 2005

(51) Int. Cl.
*G06F 13/36*    (2006.01)
(52) U.S. Cl. .......................... 710/315; 710/62
(58) Field of Classification Search ........... 710/300, 710/315, 62, 65
See application file for complete search history.

(56) References Cited

U.S. PATENT DOCUMENTS

| | | | |
|---|---|---|---|
| 5,542,055 A * | 7/1996 | Amini et al. | 710/306 |
| 5,771,360 A * | 6/1998 | Gulick | 710/307 |
| 6,393,548 B1 | 5/2002 | Kerstein et al. | 712/43 |
| 6,434,654 B1 | 8/2002 | Story et al. | 710/307 |
| 6,466,825 B1 * | 10/2002 | Wang et al. | 700/5 |
| 6,594,712 B1 * | 7/2003 | Pettey et al. | 710/22 |
| 2004/0172494 A1 * | 9/2004 | Pettey et al. | 710/305 |
| 2004/0187107 A1 * | 9/2004 | Beverly et al. | 718/100 |
| 2004/0260843 A1 * | 12/2004 | Sleeman | 710/8 |
| 2005/0120153 A1 * | 6/2005 | Perez et al. | 710/62 |
| 2005/0120163 A1 * | 6/2005 | Chou et al. | 711/103 |
| 2005/0149658 A1 * | 7/2005 | Martin et al. | 710/302 |
| 2005/0198423 A1 * | 9/2005 | Hsieh | 710/301 |
| 2005/0215085 A1 * | 9/2005 | Mehta et al. | 439/65 |
| 2005/0258243 A1 * | 11/2005 | Hsieh | 235/441 |

OTHER PUBLICATIONS

PCISIG, "PCI Express to PCI/PCI-X Bridge Specification", Jul. 2003, PCISIG, Rev. 1.0, p. 22.*
Definition of Infiniband from Wikipedia.*
The PCI Express-Infiniband Connection, RTC Magazine, undated, copyrigted 2007.*
Definition of Infiniband from Wikipedia, undated.*

* cited by examiner

*Primary Examiner*—Khanh Dang
(74) *Attorney, Agent, or Firm*—Campbell Stephenson LLP (57) ABSTRACT

An apparatus for converting a PCI/PCI X device into a PCI-Express device. The apparatus may include a first circuit configured to receive first data, wherein the first circuit is configured to translate the first data into PCI formatted data. The apparatus may also include a PCI data bus and a second circuit coupled to the first circuit via the PCI data bus. The second circuit is configured to receive the PCI formatted data from the first circuit via the PCI data bus. The second circuit is configured to translate the PCI formatted data received from the first circuit into PCI-Express formatted data. However, the PCI data bus transmits data between only the first and second circuits.

19 Claims, 6 Drawing Sheets

PCI-EXPRESS TO PCI/PCI X TRANSLATOR

BACKGROUND OF THE INVENTION

Figure 1:
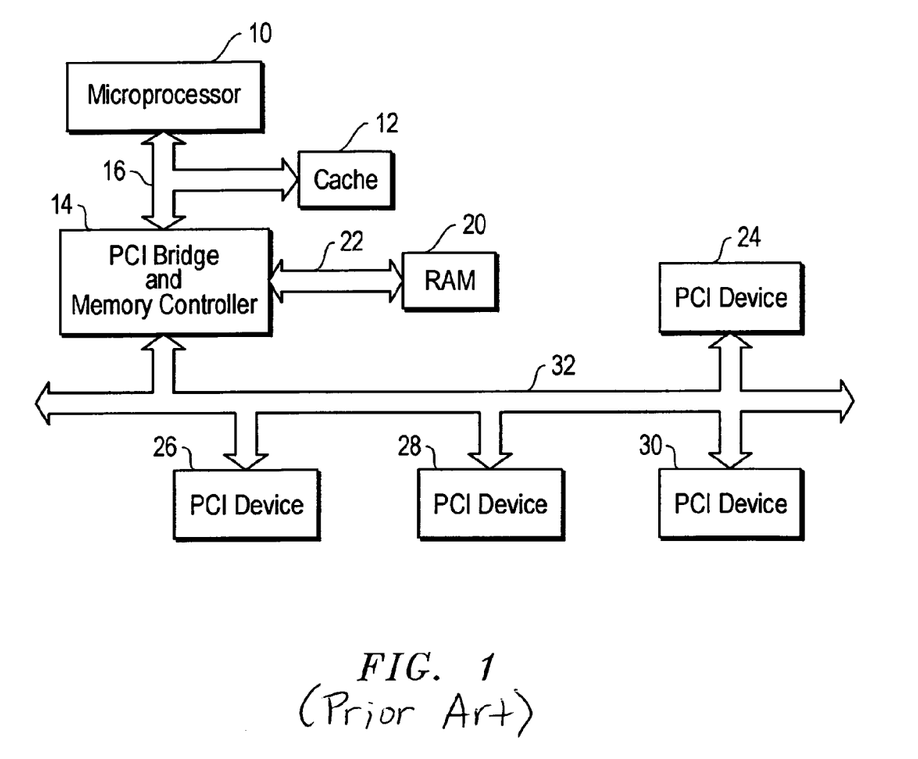
FIG. 1 is a block diagram illustrating a computer system employing a PCI bus.

Computer systems include devices such as microprocessors, main memory, disk drives, network adaptors, etc., that communicate with each other via data buses. Typical computer systems include a system bus, a memory bus, and a local bus. FIG. 1 is a block diagram illustrating a computer system employing several devices coupled together via a system bus, a memory bus, and a PCI bus. More particularly, FIG. 1 shows a microprocessor 10, cache 12, and PCI bridge/memory controller (hereinafter PCI bridge) 14 coupled together via system bus 16. PCI bridge could be implemented in one or multiple devices. Main memory 20 is also included; however main memory 20 is coupled to PCI bridge 14 via memory bus 22. Additionally, FIG. 1 shows PCI bridge 14 coupled to PCI devices 24, 26, 28 and 30 via PCI bus 32. It is noted that two devices can be coupled together directly or indirectly. For example, PCI device 24 is coupled to PCI device 30.

PCI Local Bus Specifications (including version 2.3) and PCI-X Specifications (including version 2.0) (available at www.pcisig.com) are exemplary, published versions of the PCI bus specification that defines the PCI signaling and protocol characteristics of PCI bridge 14, PCI devices 24-30, and/or PCI bus 32. PCI Local Bus Specifications and PCI-X Local Bus Specifications are incorporated herein by reference in their entirety. For ease of explanation, operational characteristics of PCI bridges, PCI devices, and/or PCI buses will be described herein as components conforming to the signaling and protocol of the latest PCI Local Bus Specification.

PCI bridge 14 is a device well known in the art. PCI bridge 14 is provided as a buffer/translator between PCI bus 32 and system bus 16. The signaling and protocol on the PCI bus 32 (as defined, for example, by a PCI Local Bus Specification) is different than the signaling and protocol on the system bus 16. PCI bridge 14 "bridges" these differences between signaling and protocol so that PCI devices 24, 26, 28 and 30 may communicate with, for example, microprocessor 10, memory 20 or cache 12. In other words, PCI bridge 14 receives and subsequently translates PCI formatted data into data formatted for transmission over system bus 16 and memory bus 22, and vice versa.

Figure 2:
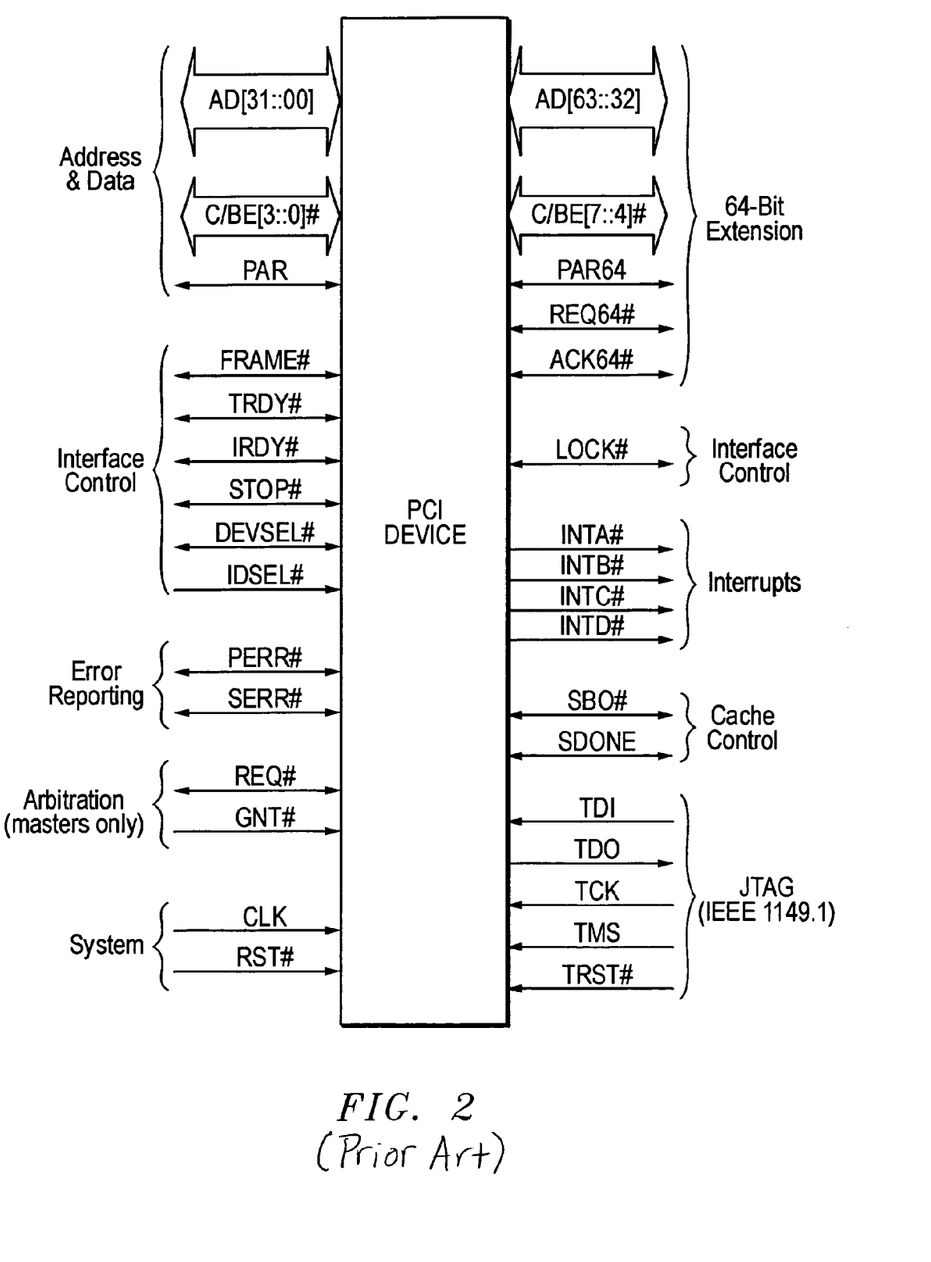
FIG. 2 is a block diagram illustrating an exemplary PCI device

FIG. 2 illustrates (in block diagram form) pin requirements for PCI devices 24, 26, 28 and 30 to interface with PCI bus 32 according to PCI Local Bus Specification. FIG. 2 shows that each PCI device requires a minimum of 47 pins for a target only device and 49 pins for a master device to handle data and addressing, interface control, arbitration, and system functions on PCI bus 32. A master device initiates a read or write-data transaction directed to another device. Targeted devices are those to which the read or write-data transactions are directed.

FIG. 2 shows the pins in functional groups, with required pins on the left side and optional pins on the right side. The clock (CLK) provides timing for all read or write transactions on PCI bus 32. Address and data (AD[31::00]) are multiplexed on the same PCI pins. A bus transaction consists of an address phase followed by one or more data phases. It is noted that PCI data bus supports both read and write bursts. The remaining definition of the signals shown in FIG. 2 can be found in PCI Local Bus Specification.

Figure 3:
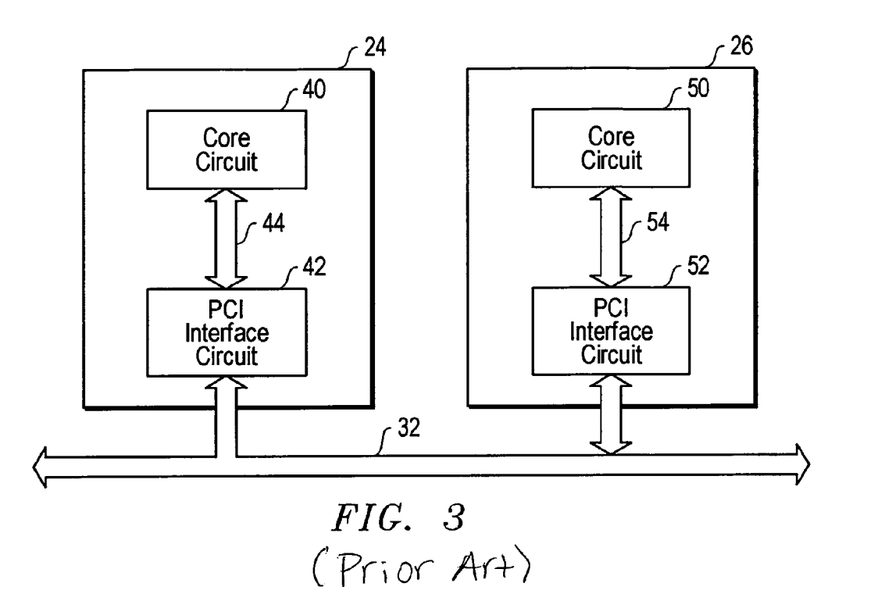
FIG. 3 is a block diagram illustrating relevant components of a pair of PCI in the computer system shown in FIG. 1.

FIG. 3 illustrates, in block diagram form, relevant components of PCI devices 24 and 26. PCI devices 28 and 30 may take similar form. PCI device 24 includes core circuit 40, internal bus 44, and PCI interface 42, while PCI device 26 includes core circuit 50, internal bus 54, and PCI interface 52. PCI interfaces 42 and 52 are circuits coupled between parallel internal buses 44 and 54, respectively, and PCI bus 32.

Respective components in PCI devices 24 and 26 differ in structure and operating characteristics. In other words, core circuits 40 and 50 are substantially different in structure and operating characteristics from each other, internal buses 44 and 54 are substantially different in structure and operating characteristics from each other, and PCI interfaces 42 and 52 are substantially different in structure and operating characteristics from each other. To illustrate, core circuit 40 may take form in one or more components of a graphics controller, while core circuit 50 may take form in one or more components of a universal serial bus (USB) host controller. Data is transmitted back and forth between core circuit 40 and PCI interface 42 using a signaling and protocol unique to bus 44, while data is transmitted back and forth between core circuit 50 and PCI interface 52 using a signaling and protocol unique to bus 54. The signaling for buses 44 and 54 are different from each other. Moreover, the signaling and protocol on internal buses 44 and 54 are different from the signaling and protocol of PCI bus 32. PCI interface 42 translates the difference in signaling and protocol in PCI bus 32 and internal bus 44, while PCI interface 52 translates the difference in signaling and protocol in PCI bus 32 and internal bus 54. In other words, PCI interface 42 translates data received from core circuit 40 in a format for transmission over internal bus 44 into data formatted for transmission over PCI bus 32 and vice versa, while PCI interface 52 translates data received from core circuit 50 in a format for transmission over internal bus 54 into data formatted for transmission over PCI bus 32 and vice versa. The PCI interfaces operate according to the signaling and protocol of PCI Local Bus Specification and enable the core circuits 40 and 50 to communicate with other devices via PCI bus 32. Although the PCI interface circuits 42 and 52 can communicate with PCI bus 32, PCI interface circuit 42 cannot be successfully replaced with the PCI interface circuit 52 or vice versa.

PCI has been successfully used as a local bus in computer systems in the past. However, demands of emerging and future computer systems will exceed the bandwidth and scalability limits that are inherent in PCI bus implementations. PCI-Express bus is a new bus designed to replace the PCI bus and address limitations thereof. PCI-Express bus is also designed as a replacement to the system bus (e.g., system bus 16). However, the present invention will be described with reference to PCI-Express as a replacement to PCI bus.

PCI-Express bus and PCI bus are substantially different. Unlike the PCI bus, the PCI-Express bus is a serial bus, and as such PCI-Express bus employs a reduced number of traces (i.e., conductive lines) for transmitting data between PCI-Express devices. This provides several advantages. The reduction of traces eases the costs of computer systems employing the PCI-Express bus. The reduced number of traces also reduces electromagnetic interference (EMI) and radio frequency interference (RFI) shieldings.

Figure 4:
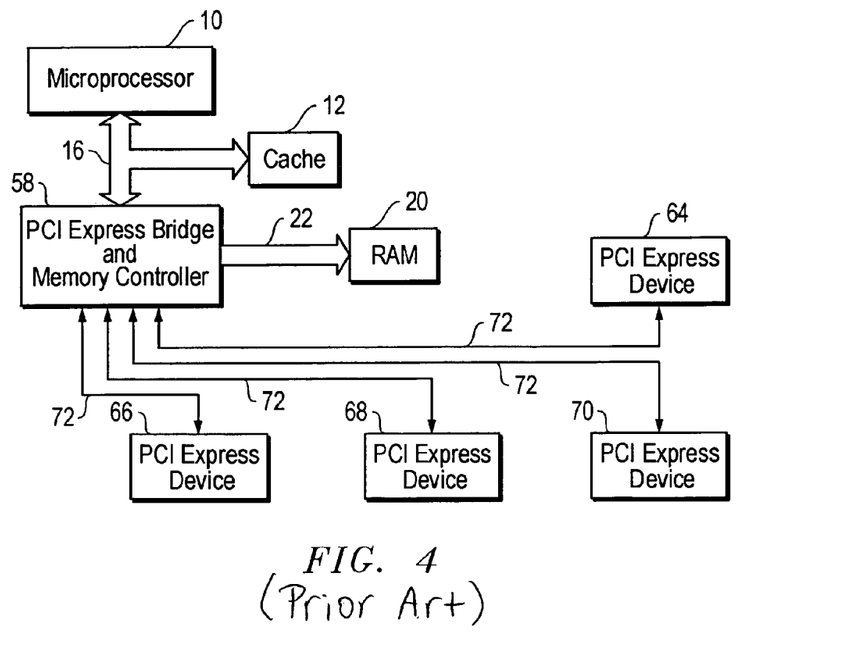
FIG. 4 is a block diagram illustrating a computer system employing a PCI-Express bus.

FIG. 4 shows the computer system of FIG. 1 with the PCI bridge 14, PCI devices 24-30, and PCI bus 32 replaced by PCI-Express bridge 58, PCI-Express devices 64-70, and PCI-Express buses 72, respectively. PCI-Express is a point-to-point technology. As such, a separate PCI-Express bus 72 connects PCI-Express bridge 58 to individual PCI-Express devices 64, 66, 68, or 70 as shown. Several versions of PCI-Express Specification define the signaling and protocol characteristics of PCI-Express bridge 58, PCI-Express devices 64, 66, 68 and 70, and/or PCI-Express busses 72. Each version is incorporated herein by reference in its entirety.

Protocol and signaling for the system bus 16 is substantially different than the protocol and signaling for each PCI-Express bus 72. Without PCI-Express bridge 58, PCI devices 64, 66, 68 and 70 could not communicate with, for example, microprocessor 10. PCI-Express bridge 58 acts as a buffer/translator between a PCI-Express device and devices coupled to system bus 16 and memory bus 22. PCI Express bridge 58 translates PCI-Express formatted data into data formatted for transmission over system bus 16 and memory bus 22, and vice versa.

Figure 5:
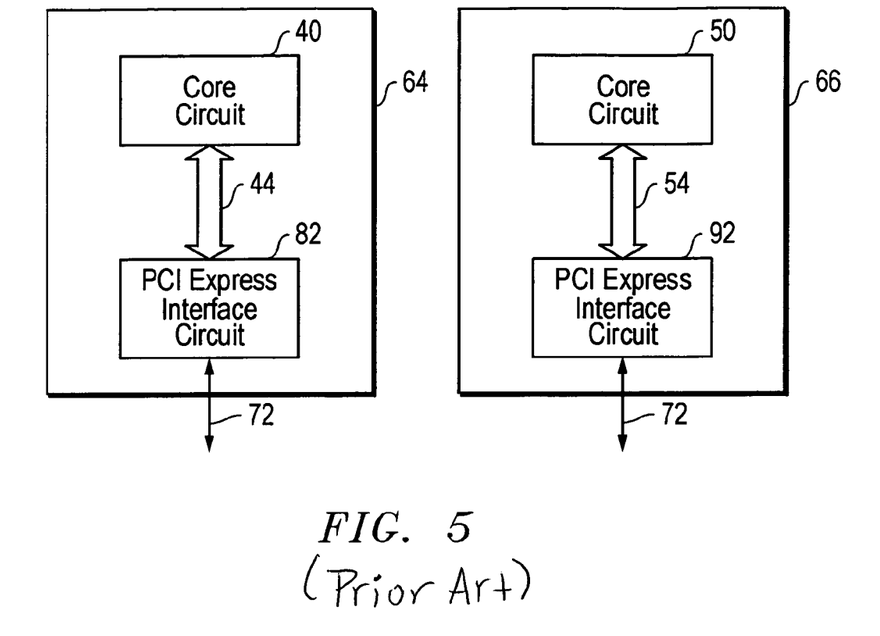
FIG. 5 is a block diagram illustrating relevant components of a pair of PCI-Express devices in the computer system shown in FIG. 4.

FIG. 5 is a block diagram showing relevant components of PCI-Express devices 64 and 66 coupled to respective PCI-Express buses 72. The PCI-Express devices shown in FIG. 5 are the PCI devices shown in FIG. 3 with the PCI interface circuits 42 and 52 replaced by PCI-Express interface circuits 82 and 92, respectively. PCI-Express interface circuit 82 is substantially different than the PCI interface circuit 42, and PCI-Express interface circuit 92 is substantially different than the PCI interface circuit 52. The signaling and protocol on internal buses 44 and 54 are different from the signaling and protocol of PCI-Express buses 72. PCI-Express interface 82 translates the difference in signaling and protocol in PCI-Express bus 72 and internal bus 44, while PCI-Express interface 92 translates the difference in signaling and protocol in PCI-Express bus 72 and internal bus 54. In other words, PCI-Express interface 82 translates data received from core circuit 40 in a format for transmission over internal bus 44, into data formatted for transmission over PCI-Express bus 72 and vice versa, while PCI-Express interface 92 translates data received from core circuit 50 in a format for transmission over internal bus 54, into data formatted for transmission over PCI-Express bus 72 and vice versa. The PCI-Express interfaces operate according to the signaling and protocol of a PCI-Express Specification and enable the core circuits 40 and 50 to communicate with other devices.

Although the PCI-Express interface circuits 82 and 92 can communicate with PCI-Express bus 72, PCI-Express interface circuit 82 cannot be successfully replaced with the PCI-Express interface circuit 92 or vice versa. Accordingly, each PCI interface circuit (or class of PCI interface circuits) of PCI devices 24, 26, 28 and 30 must be replaced with a unique PCI-Express interface circuit in order to successfully transform PCI devices 24, 26, 28 and 30 into PCI-Express devices 64, 66, 68 and 70, respectively. The time and cost for designing these replacement PCI-Express interface circuits may impede the manufacture and sale of computer systems such as that shown in FIG. 4. And the time and cost for designing these replacement PCI-Express interface circuits may impede the manufacture and sale of PCI Express devices such as that shown in FIG. 4.

SUMMARY OF THE INVENTION

An apparatus for converting a PCI/PCI X device into a PCI-Express device. The apparatus may include a first circuit configured to receive first data, wherein the first circuit is configured to translate the first data into PCI formatted data. The apparatus may also include a PCI data bus and a second circuit coupled to the first circuit via the PCI data bus. The second circuit is configured to receive the PCI formatted data from the first circuit via the PCI data bus. The second circuit is configured to translate the PCI formatted data received from the first circuit into PCI-Express formatted data.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 6:
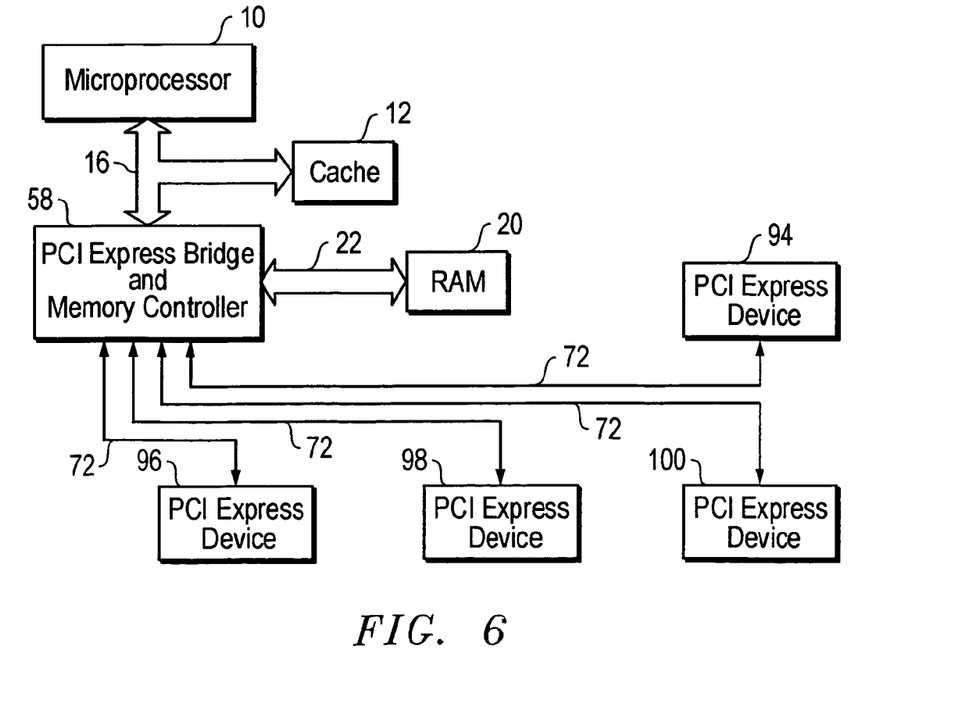
FIG. 6 is a block diagram illustrating a computer system employing one embodiment of the present invention.

FIG. 6 is a block diagram of a computer system that employs one embodiment of the present invention. The present invention will be described with reference to a computer system, it being understood that the present invention should not be limited thereto. In other words, the present invention may be employed in systems (e.g., communication systems) other than computer systems.

FIG. 6 is the computer system shown in FIG. 1 with the PCI bridge 14, PCI devices 24, 26, 28 and 30, and PCI bus 32 replaced by PCI-Express bridge 58, PCI-Express devices 94-100, and PCI-Express buses 72. PCI-Express Specification defines the signaling and protocol used by PCI-Express devices 94, 96, 98 and 100 to enable communication with each other and with PCI-Express bridge 58 via PCI-Express buses 72. PCI-Express bridge 58 and PCI-Express buses 72 in FIGS. 4 and 6 may be identical. The present invention may be implemented in one or more of the PCI devices 94-100. For purposes of explanation only, it will be presumed that each of the PCI-Express devices 94, 96, 98 and 100 implements the present invention.

Figure 7:
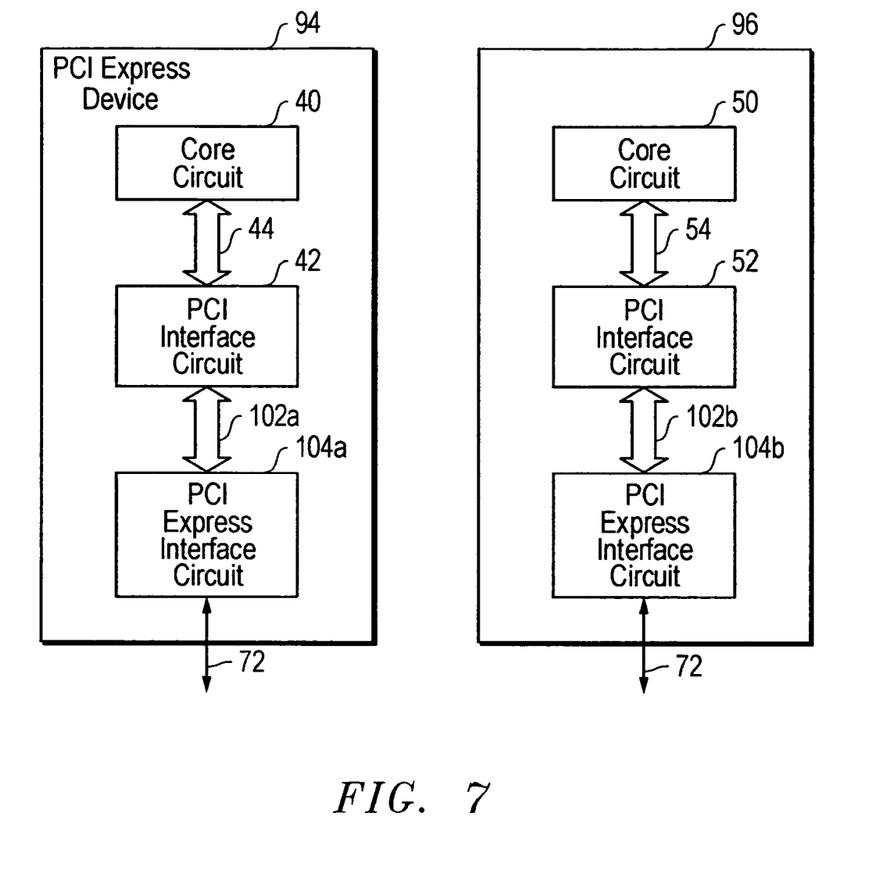
FIG. 7 is a block diagram illustrating relevant components of a pair of PCI-Express devices in the computer system shown in FIG. 6.

FIG. 7 illustrates in block diagram form, relevant components of PCI-Express devices 94 and 96. PCI-Express device 94 includes components 40-44 of PCI device 24 shown in FIG. 3, while PCI-Express device 96 includes components 50, 52, and 54 of the PCI device 24. Additionally, PCI-Express devices 94 and 96 include an internal PCI bus 102*a* and 102*b*, respectively, and PCI-Express interface circuits 104*a* and 104*b*, respectively. For purposes of explanation, the internal PCI buses 102*a* and 102*b* are identical to each other in structure and operating characteristics, and the PCI-Express interface circuits 104a and 104b are identical to each other in structure and operating characteristics, it being understood that the present invention should not be limited thereto. PCI-Express interface circuits 104a and 104b (hereinafter circuits 104a and 104b) couple their respective internal PCI buses 102a and 102b to PCI-Express buses 72. Circuits 104a and 104b will be more fully described below.

The components of either PCI-Express device 94 or 96 shown in FIG. 7 may be integrally formed on a common substrate using standard semiconductor manufacturing techniques. Alternative embodiments are contemplated. For example, the components (e.g., circuits 40, 42, and 104a) of the PCI-Express device 94 may be formed on three separate semiconductor substrates and coupled together by buses 44 and 102a separately formed on a printed circuit board. In this embodiment, the separate semiconductor substrates can be independently packaged and mounted on the common printed circuit board with the buses 44 and 102a formed on the printed circuit board. In still another embodiment, PCI interface circuit 42, internal PCI bus 102a, and common circuit 104a of PCI-Express device 94 may be integrally formed on a common substrate while core circuit 40 is formed on a separate semiconductor substrate. Other embodiments are contemplated.

Internal PCI buses 102a and 102b operate according to the protocol and signaling described in a PCI Local Bus Specification. As such, data transmitted between PCI interface circuits 42 and 52 and circuits 104a and 104b, respectively, via buses 102a and 102b, respectively, is formatted according to the protocol and signaling described in a PCI local bus specification. The protocol and signaling on PCI-Express bus 72 is substantially different from the protocol and signaling on internal PCI buses 102a and 102b. Circuits 104a and 104b translate the differences in protocols between internal PCI buses 102a and 102b, respectively, and PCI-Express bus 72. For example, common circuit 104a translates data formatted for transmission over internal PCI bus 102a, into data formatted for transmission over PCI-Express bus 72 and vice versa. Common circuits 102a and 102b enable the combination of core circuit 40 and PCI interface circuit 42 to communicate with the combination of core circuit 50 and PCI interface circuit 52.

As noted above, the signaling and protocol on bus 44 is different than the signaling and protocol on bus 54. The signaling protocol on buses 44 and 54 are also different from the signaling and protocol on buses 102a or 102b. PCI interface circuit 42 "translates" the differences in signaling protocol between internal bus 44 and internal PCI bus 102a, while PCI interface circuit 52 "translates" the differences in signaling protocol between internal bus 54 and internal PCI bus 102b. In other words, PCI interface circuit 42 translates PCI formatted data into data formatted for subsequent transmission over bus 44 and vice versa, while PCI interface circuit 52 translates PCI formatted data into data formatted for subsequent transmission over bus 54 and vice versa.

It is noted that PCI interface circuit 42 and circuit 104a are the only two circuits coupled to internal PCI bus 102a, and PCI interface circuit 52 and circuit 104b are the only two circuits coupled to internal PCI bus 102b. Accordingly, internal PCI bus 102a transmits PCI formatted data only between PCI interface circuit 42 and common circuit 104a, and internal PCI bus 102b transmits PCI formatted data only between PCI interface circuit 52 and common circuit 104b. No circuit other than PCI interface circuit 42 and circuit 104a can transmit data over internal PCI bus 102a at any time, and no circuit other than PCI interface circuit 52 and circuit 104b can transmit data over internal PCI bus 102b at any time. In an alternative embodiment, internal PCI bus 102a may be configured so that it can also couple to another circuit or to an external PCI bus such as PCI bus 32 shown in FIG. 1. When internal bus 102a is coupled to an external PCI bus in this alternative embodiment, common circuit 104a may continue to receive or transmit to data PCI interface circuit 42; and data transmitted by PCI interface circuit 42 is transmitted to the external PCI bus via its coupling to internal PCI bus 102a.

Figure 8:
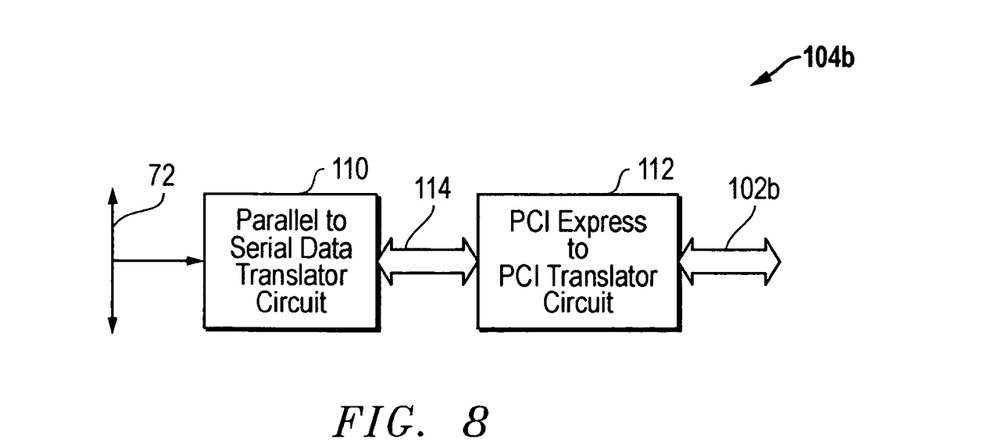
FIG. 8 is a block diagram illustrating relevant components of a common PCI-Express interface circuit shown in FIG. 7.

FIG. 8 illustrates relevant components of one of many embodiments of the circuit 104b shown in FIG. 7. Circuit 104a may be similar or identical to that shown in FIG. 8. The circuit shown in FIG. 8 includes a parallel-to-serial data conversion circuit 110 (hereinafter referred to as P/S circuit 110) coupled to a PCI-to-PCI-Express translator circuit 112 (hereinafter bus translator circuit 112) via internal parallel bus 114. It is noted that components 110-114 shown in FIG. 8 may be integrated onto a common semiconductor substrate. Alternatively, P/S circuit 110 and bus translator circuit 112 may be integrally formed on separate semiconductors and mounted on a printed circuit board having parallel bus 114 formed thereon.

Bus translator circuit 112 may receive PCI formatted data from the PCI interface circuit 52 (FIG. 7) via internal PCI bus 102b. Bus translator circuit 112 processes the received data for subsequent transmission to P/S circuit 110 via internal bus 114. Data is transmitted between P/S circuit 110 and bus translator circuit 112 in parallel format. P/S circuit 110 converts parallel data received from bus translator circuit 112 into serial data before subsequent transmission over PCI-Express bus 72 or converts serial PCI-Express formatted data into parallel data before subsequent transmission to translator circuit 112.

Figure 9:
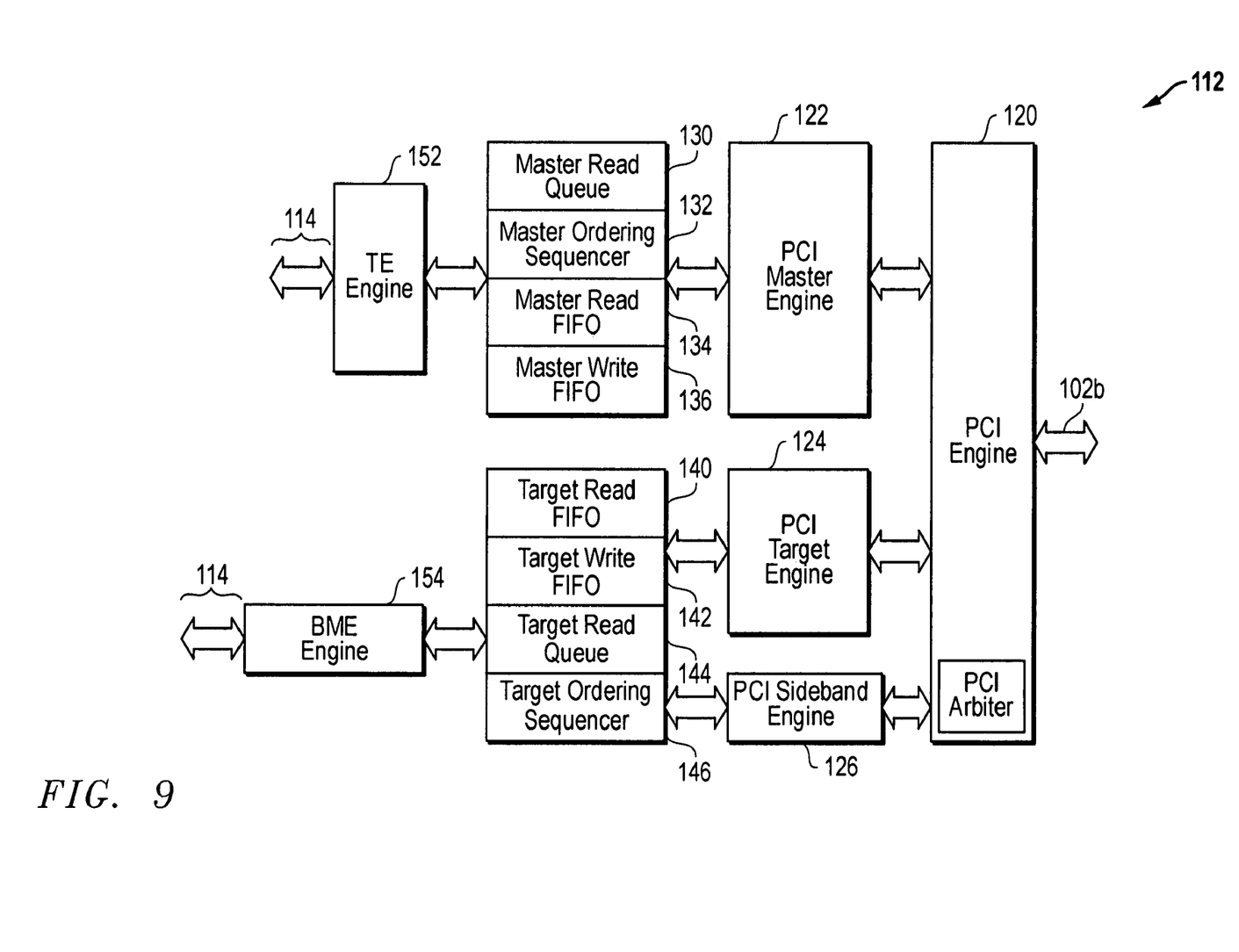
FIG. 9 is a block diagram illustrating relevant components of the PCI-Express to PCI translator circuit shown in FIG. 8.

FIG. 9 illustrates in block diagram form, relevant components of one embodiment of bus translator circuit 112. The bus translator circuit 112 shown in FIG. 9 includes a PCI engine 120 coupled to internal PCI bus 102b. The PCI engine 120 includes a PCI arbiter. The bus translator circuit 112 also includes PCI master engine 122, PCI target engine 124, PCI sideband engine 126, target engine or TE engine 152, bus master engine or BME engine 154. TE engine 152 is coupled to internal bus 114. BME engine 154 is also coupled to internal bus 114.

Each of PCI engine 120, PCI master engine 122, PCI target engine 124, PCI sideband engine 126, TE engine 152, and BME engine 154 are a clocked circuit. PCI engine 120, PCI master engine 122, PCI target engine 124, and PCI sideband engine 126 are provided with a first clock that has a first frequency that may be substantially different than the second frequency of a second clock provided to TE engine 152, and BME engine 154. A set of asynchronous, dual-port FIFOs 130-146 is provided to accommodate the differences in clock frequencies of TE engine 152, and BME engine 154 on one side and PCI master engine 122, PCI target engine 124, PCI sideband engine 126 on the other side. PCI master engine 122 is coupled to ports of FIFOs 130-136 that operate at the first clock frequency while TE engine 152 is coupled to ports of FIFOs 130-136 that operate at the second clock frequency. PCI target engine 124 and PCI sideband engine 126 are coupled to ports of FIFOs 140-146 that operate at the first clock frequency while BME engine 154 is coupled to ports of FIFOs 140-146 that operate at the second clock frequency.

With reference to FIGS. 6-9, PCI-Express device 96 may receive from, e.g., PCI-Express bridge 58, transactions to read or write-data. The write-data transaction will include the data to be written and an instruction or request to write data at a memory address. The read-data transaction will include the memory address where data is to be read. Circuit 104b receives and processes the read and write-data transactions to generate corresponding requests for PCI interface circuit 52. In turn PCI interface circuit 52 receives and processes the read and write-data transactions to generate corresponding requests core circuit 50. Core circuit 50 may perform read or write operations in response to receiving the requests from PCI interface circuit 52. Data read by core circuit 50 is returned to circuit 104b via PCI interface circuit 52 before it is forwarded to PCI-Express bridge 58 via PCI-Express bus 72.

When a write-data transaction is received and processed by TE engine 152 of translator circuit 112 (FIG. 9), the data to be written is stored in FIFO 136 (also designated master write FIFO 136) and a corresponding write-request (including a write address) is stored in FIFO 132 (also designated master ordering sequencer 132). In similar fashion, after a read-data transaction is received and processed by TE engine 152, a corresponding read-request (including a read address) is stored in master ordering sequencer 132. PCI master engine 122 retrieves read and write requests stored in master ordering sequencer 132 for subsequent processing prior to transmission to core circuit 50 (FIG. 7) via PCI engine 120. For each write-request PCI master engine 122 retrieves from master ordering sequencer 132, PCI master engine 122 also retrieves corresponding write-data from master write FIFO 136.

Data read by core circuit 50 in response to a read request, is returned to translator circuit 112 and stored in FIFO 134 (also designated master read FIFO 134) until retrieved by TE engine 152. For each set of read data stored in master read FIFO 134, a corresponding message is stored in FIFO 130 (also designated master read queue 130). This message identifies the read-data transaction or the PCI-Express device that seeks the data. TE engine 152 retrieves messages stored in master read queue 130 along with corresponding data from master read FIFO 134. The messages and data read from master read queue 130 and master read FIFO 134 are subsequently processed by TE engine 152 and P/S translator circuit 110 into a transaction for transmission over PCI-Express bus 72 to the PCI-Express device that requested the data.

Circuit 104b also receives from core circuit 50 requests to read or write-data to memory of, e.g., PCI-Express device 94. The write-data requests may include the data to be written at a memory address. Circuit 104b generates read and write-data transactions in response to receiving and processing requests from core circuit 50. The read and write-data transactions are subsequently transmitted PCI-Express device 94 via PCI-Express buses 72 and PCI-Express bridge 58. PCI-Express device 94, in turn, will write data to or read data from its memory in response to receiving the transactions. Data read by PCI-Express device 94 is returned to and stored in common circuit 104b before it is forwarded to core circuit 50.

FIFOs 140-146 operate in similar fashion to FIFOs 130-136 when common circuit 104b receives requests to read or write data from core circuit 50. After a request to write-data is received and processed by PCI engine 120 and PCI target engine 124, the data to be written is stored in FIFO 142 (also designated target write FIFO 142). A corresponding write-request (including a write address) is stored in FIFO 146 (also designated target ordering sequencer 146). In similar fashion, after a read-data transaction is received and processed by PCI engine 120 and PCI target engine 124, a corresponding read-request (including a read address) is stored in target ordering sequencer 146. BME engine 154 retrieves read and write requests stored in target ordering sequencer 146, and generate read or write-data transactions for subsequent transmission to PCI-Express device 94 via P/S translator circuit 110 and PCI-Express bus 72. For each write-request BME engine 154 retrieves from target ordering sequencer 146, BME engine 154 also retrieves corresponding write-data from target write FIFO 142.

Data read by PCI-Express device 94 in response to a read-data transaction received from PCI-Express device 96, is returned to common circuit 104b and stored in FIFO 140 (also designated target read FIFO 140) via BME engine 154 until retrieved by PCI target engine 152. A message is generated for each set of data stored in target read FIFO 140. These messages are stored in FIFO 144 (also designated target read queue) and identify the read-data requests that seek the corresponding data. PCI target engine 124 retrieves messages stored in target read queue 144 along with corresponding data from target read FIFO 140. The messages and data read from target read queue 144 and target read FIFO 140 are subsequently processed by PCI target engine 124 and PCI engine 120.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:
1. An apparatus comprising:
a first circuit configured to receive first data, wherein the first circuit is configured to translate the first data into PCI formatted data;
a PCI data bus;
a second circuit coupled to the first circuit via the PCI data bus, wherein the second circuit is configured to receive the PCI formatted data from the first circuit via the PCI data bus, wherein the second circuit is configured to translate the PCI formatted data received from the first circuit into PCI-Express formatted data;
wherein the PCI data bus is configured to transmit data between only the first and second circuits.
2. The apparatus of claim 1 further comprising:
a PCI-Express data bus;
a second PCI data bus;
a third circuit configured to receive third data, wherein the third circuit is configured to translate the third data into PCI formatted data;
a fourth circuit coupled to the third circuit via the second PCI data bus and coupled to the second circuit via the PCI-Express data bus, wherein the fourth circuit is configured to receive the PCI formatted data from the third circuit via the second PCI data bus, wherein the fourth circuit is configured to translate the PCI formatted data received from the third circuit into PCI-Express formatted data;
wherein the second PCI data bus is configured to transmit data between only the third and forth circuits.
3. The apparatus of claim 1 further comprising:
a PCI-Express data bus coupled to the second circuit;
a translator circuit coupled to the second circuit via the PCI-Express data bus.
4. The apparatus of claim 1 wherein the first circuit, the second circuit, and the PCI data bus are integrally formed on one semiconductor substrate.

5. The apparatus of claim 1 wherein the first and second circuits are formed on first and second semiconductor substrates, respectively, wherein the PCI data bus is formed on a printed circuit board.

6. An apparatus comprising:
a PCI data bus;
a first circuit coupled to the PCI data bus and configured to receive first data, wherein the first circuit is configured to format the first data for subsequent transmission over the PCI data bus;
a second circuit coupled to the first circuit via the PCI data bus, wherein the second circuit is configured to receive second data from the first circuit via the PCI data bus, wherein the second circuit is configured to translate the second data for subsequent transmission over a PCI-Express bus;
wherein the PCI data bus is configured to transmit data between only the first and second circuits.

7. The apparatus of claim 6 further comprising:
the PCI-Express data bus;
a second PCI data bus;
a third circuit coupled to the second PCI data bus and configured to receive third data, wherein the third circuit is configured to process the third data for subsequent transmission over the second PCI data bus;
a fourth circuit coupled to the third circuit via the second PCI data bus, wherein the fourth circuit is configured to receive fourth data from the third circuit via the second PCI data bus, wherein the fourth circuit is configured to process the third data for subsequent transmission over the PCI-Express bus;
wherein the second PCI data bus is configured to transmit data between only the third and fourth circuits.

8. The apparatus of claim 6 further comprising:
the PCI-Express data bus coupled to the second circuit;
a translator circuit coupled to the second circuit via the PCI-Express data bus.

9. The apparatus of claim 6 wherein the first circuit, the second circuit, and the PCI data bus are integrally formed on one semiconductor substrate.

10. The apparatus of claim 6 wherein the first and second circuits are formed on first and second semiconductor substrates, respectively, wherein the PCI data bus is formed on a printed circuit board.

11. A system comprising:
a first pair of circuits;
a second pair of circuits;
a first PCI data bus, wherein the first PCI data bus only transmits data between the first pair of circuits;
a second PCI data bus, wherein the second PCI data bus transmits data between the second pair of circuits;
first and second PCI-Express data buses coupled to one circuit of the first pair and one circuit of the second pair, respectively to allow communication between the first pair of circuits and the second pair of circuits via the first and second PCI-Express data buses.

12. The system of claim 11 wherein the first pair of circuits and the first PCI data bus are integrally formed on one semiconductor substrate.

13. The system of claim 11 wherein the first pair of circuits are formed on respective semiconductor substrates, and wherein the PCI data bus is formed on a printed circuit board.

14. The system of claim 11 wherein the first PCI data bus transmits data only between the first pair of circuits, and wherein the second PCI data bus transmits data only between the second pair of circuits.

15. An integrated circuit comprising:
a PCI data bus formed on a substrate;
a first sub-circuit formed on the substrate; wherein the first sub-circuit is configured to receive a first data and translate the first data into PCI formatted data;
a second sub-circuit formed on the substrate, wherein the sub-second circuit is configured to receive the PCI formatted data from the first sub-circuit and translate the PCI formatted data into PCI Express formatted data;
wherein the PCI data bus transmits data only between the first and second sub-circuits; wherein the PCI data bus, the first sub-circuit, and the second sub-circuit are integrally formed on the substrate.

16. The apparatus of claim 1 the wherein the PCI data bus couples only the first and second circuits.

17. The apparatus of claim 6 the wherein the PCI data bus couples only the first and second circuits.

18. The integrated circuit of claim 15 the wherein the PCI data bus couples only the first and second circuits.

19. An apparatus comprising:
a core circuit;
a data bus;
a first circuit coupled to the core circuit via the data bus and configured to receive first data from the core circuit, wherein the first circuit is configured to translate the first data into PCI formatted data;
a PCI data bus;
a second circuit coupled to the first circuit via the PCI data bus, wherein the second circuit is configured to receive the PCI formatted data from the first, wherein the second circuit is configured to translate the PCI formatted data received from the first circuit into PCI-Express formatted data;
wherein the PCI data bus is configured to transmit data between only the first and second circuits.

* * * * *